(12) United States Patent
Himi

(10) Patent No.: US 10,011,278 B2
(45) Date of Patent: Jul. 3, 2018

(54) COLLISION AVOIDANCE SYSTEM

(71) Applicant: TOYOTA JIDOSHA KABUSHIKI KAISHA, Toyota-shi, Aichi-ken (JP)

(72) Inventor: Tomoyuki Himi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/201,729

(22) Filed: Jul. 5, 2016

(65) Prior Publication Data

US 2017/0008517 A1    Jan. 12, 2017

(30) Foreign Application Priority Data

Jul. 6, 2015   (JP) ................ 2015-135480

(51) Int. Cl.
| | |
|---|---|
| *B60W 30/09* | (2012.01) |
| *B60W 50/14* | (2012.01) |
| *G01S 13/89* | (2006.01) |
| *G01S 15/93* | (2006.01) |
| *G01S 13/86* | (2006.01) |

(Continued)

(52) U.S. Cl.
CPC ............ *B60W 30/09* (2013.01); *B60W 50/14* (2013.01); *G01S 13/862* (2013.01); *G01S 13/87* (2013.01); *G01S 13/89* (2013.01); *G01S 13/931* (2013.01); *G01S 15/87* (2013.01); *G01S 15/931* (2013.01); *B60W 2420/52* (2013.01); *B60W 2420/54* (2013.01); *B60W 2550/10* (2013.01); *G01S 2013/9317* (2013.01); *G01S 2013/9332* (2013.01); *G01S 2013/9378* (2013.01);

(Continued)

(58) Field of Classification Search
CPC .. B60W 30/09; B60W 50/14; B60W 2420/52; B60W 2420/54; B60W 2550/10; G01S 13/89
USPC .......... 701/301, 70; 340/436, 435, 438, 903; 342/70
See application file for complete search history.

(56) References Cited

U.S. PATENT DOCUMENTS

| | | | |
|---|---|---|---|
| 9,305,463 B1* | 4/2016 | Yellambalase ... | H04N 21/42203 |
| 2004/0167718 A1* | 8/2004 | Hoenes ................ | B60Q 9/006 |
| | | | 701/301 |

(Continued)

FOREIGN PATENT DOCUMENTS

| | | |
|---|---|---|
| JP | 2006306233 A | 11/2006 |
| JP | 2007-304069 A | 11/2007 |
| JP | 2013-045142 A | 3/2013 |

*Primary Examiner* — Marthe Y Marc-Coleman
(74) *Attorney, Agent, or Firm* — Oliff PLC

(57) ABSTRACT

A collision avoidance system includes: a radar that detects an object that is located behind a vehicle and that detects a distance to the object; a plurality of ultrasonic sensors, each of which detects the object and detects a distance to the object, the plurality of ultrasonic sensors respectively detect different detection areas; an approaching object detection unit that detects an approaching object that approaches the vehicle from among the objects; a screen estimation unit that estimates that there is a screen that blocks an approach to the vehicle from behind; and a control unit that, when the approaching object has been detected, executes driving assistance for avoiding a collision with the approaching object, and, when a distance to the approaching object is larger by a predetermined value or more than a distance to the screen, restricts or prohibits execution of the driving assistance.

3 Claims, 8 Drawing Sheets

(51) Int. Cl.
*G01S 13/87* (2006.01)
*G01S 13/93* (2006.01)
*G01S 15/87* (2006.01)

(52) U.S. Cl.
CPC . *G01S 2013/9385* (2013.01); *G01S 2015/932* (2013.01); *G01S 2015/938* (2013.01)

(56) References Cited

U.S. PATENT DOCUMENTS

| | | | | |
|---|---|---|---|---|
| 2006/0287828 | A1* | 12/2006 | Lehner | G08G 1/167 701/301 |
| 2008/0306666 | A1* | 12/2008 | Zeng | B60Q 9/006 701/70 |
| 2010/0242611 | A1* | 9/2010 | Terazawa | B06B 1/0284 73/629 |
| 2012/0062744 | A1* | 3/2012 | Schofield | B60C 23/00 348/148 |
| 2016/0033640 | A1* | 2/2016 | De Mersseman | G01S 7/2813 342/70 |

\* cited by examiner

COLLISION AVOIDANCE SYSTEM

INCORPORATION BY REFERENCE

The disclosure of Japanese Patent Application No. 2015-135480 filed on Jul. 6, 2015 including the specification, drawings and abstract is incorporated herein by reference in its entirety.

BACKGROUND OF THE INVENTION

1. Field of the Invention

The invention relates to a collision avoidance system that, when an object that approaches from behind a host vehicle, including rear sides, executes driving assistance to avoid a collision with the object.

2. Description of Related Art

There is known a driving assistance technique for, when a vehicle, or the like, (approaching object) that approaches a host vehicle from behind (including rear sides) is detected by a radar provided at the rear end of the host vehicle at the time when the host vehicle is moving backward, avoiding a collision with the approaching object by, for example, issuing an alarm (for example, Japanese Patent Application Publication No. 2013-045142 (JP 2013-045142 A)).

With this technique, for example, when the host vehicle moves backward to exit from a parking space in a state where the host vehicle is parked forward, it is possible to avoid contact, collision, or the like, with an approaching object that is difficult to be visually recognized by a driver due to the presence of another parked vehicle.

However, if a radio wave transmitted from the radar is multiply reflected or diffracted and then received by the radar as a reflected wave, a non-existent approaching object may be detected (hereinafter, such an approaching object is referred to as mirror ghost).

For example, as shown in FIG. 1, if there is a wall or a screen behind a parking space in a state where a host vehicle V is parked backward, a reflected wave from the wall may be multiply reflected from another vehicle, or the like, and received by the radar of the host vehicle V. Then, although there is the wall behind the host vehicle V and no vehicle can approach the host vehicle from the right rear side, the radar may detect a mirror ghost VG that approaches the host vehicle V from the back of the wall.

SUMMARY OF THE INVENTION

The invention provides a collision avoidance system that, when driving assistance for detecting an approaching object that approaches a host vehicle from behind with the use of a radar and then avoiding a collision with the approaching object is executed while the host vehicle is moving backward, is able to prevent or reduce erroneous operation of driving assistance due to detection of a mirror ghost.

A first aspect of the invention provides a collision avoidance system. The collision avoidance system includes: a radar that detects an object that is located behind a vehicle and that detects a distance to the detected object; a plurality of ultrasonic sensors, each of which detects the object that is located behind the vehicle and detects a distance to the detected object, the plurality of ultrasonic sensors respectively having different detection areas; an approaching object detection unit that detects an approaching object that approaches the vehicle from among objects that are detected by the radar; a screen estimation unit that, when objects have been detected by two or more of the plurality of ultrasonic sensors, estimates that there is a screen that blocks an approach to the vehicle from behind; and a control unit that, when the approaching object has been detected by the approaching object detection unit, executes driving assistance for avoiding a collision with the approaching object, and, when a distance to the approaching object is larger by a predetermined value or more than a distance to the screen, restricts or prohibits execution of the driving assistance.

A second aspect of the invention provides a collision avoidance system. The collision avoidance system includes: a radar that detects an object that is located behind a vehicle and that detects a distance to the detected object; a plurality of ultrasonic sensors, each of which detects the object that is located behind the vehicle and detects a distance to the detected object, the plurality of ultrasonic sensors respectively having different detection areas; an electronic control unit configured to identify an approaching object that approaches the vehicle from among objects that are detected by the radar, determine that there is a screen that blocks an approach to the vehicle from behind when objects have been detected by two or more of the plurality of ultrasonic sensors, and execute driving assistance for avoiding a collision with the approaching object when the approaching object has been detected, wherein the electronic control unit is configured to, when a distance to the approaching object is larger by a predetermined value or more than a distance to the screen, restrict or prohibit execution of the driving assistance.

In the above aspect, each of the plurality of ultrasonic sensors (clearance sonars) respectively having different detection areas detects an object behind the vehicle, and detects a distance to the detected object, as well as the radar.

When objects have been detected by two or more of the plurality of ultrasonic sensors, it is highly likely that there is a screen (an object that blocks an approach to the vehicle), such as a wall, having a certain width behind the vehicle. For this reason, in this case, the screen estimation unit or the electronic control unit estimates that there is a screen behind the vehicle.

A mirror ghost that occurs because of the fact that a reflected wave reflected from the screen does not directly return to the radar but is multiply reflected or diffracted and then received by the radar is detected as an approaching object that is present on the far side of the screen when viewed from the vehicle. That is, when an approaching object detected by the radar is present on the far side of the screen estimated by the screen estimation unit when viewed from the vehicle, it may be determined that a mirror ghost as an approaching object is highly likely to have been detected by the radar.

In the above aspect, the radar may include a first radar and a second radar, the first radar may detect an object that is located to a left rear side of the vehicle, and the second radar may detect an object that is located to a right rear side of the vehicle; the plurality of ultrasonic sensors may include a plurality of first ultrasonic sensors and a plurality of second ultrasonic sensors, each of the plurality of first ultrasonic sensors may detect an object that is located to the left rear side of the vehicle, and each of the plurality of second ultrasonic sensors may detect an object that is located to the right rear side of the vehicle; the approaching object detection unit may include a first approaching object detection unit and a second approaching object detection unit, the first approaching object detection unit may detect a first approaching object that is located to the left rear side of the vehicle and that approaches the vehicle from among objects detected by the first radar, and the second approaching object detection unit may detect a second approaching object that is located to the right rear side of the vehicle and that approaches the vehicle from among objects detected by the second radar; the screen estimation unit may include a first screen estimation unit and a second screen estimation unit, the first screen estimation unit, when objects have been detected by two or more of the plurality of first ultrasonic sensors, may estimate that there is a first screen that blocks an approach to the vehicle from the left rear side, and the second screen estimation unit, when objects have been detected by two or more of the plurality of second ultrasonic sensors, may estimate that there is a second screen that blocks an approach to the vehicle from the right rear side; and the control unit may include a first control unit and a second control unit, the first control unit, when the first approaching object has been detected by the first approaching object detection unit, may execute first driving assistance for avoiding a collision with the first approaching object and, when a distance to the first approaching object is larger by a predetermined value or more than a distance to the first screen, may restrict or prohibit execution of the first driving assistance, and the second control unit, when the second approaching object has been detected by the second approaching object detection unit, may execute second driving assistance for avoiding a collision with the second approaching object and, when a distance to the second approaching object is larger by a predetermined value or more than a distance to the second screen, may restrict or prohibit execution of the second driving assistance.

According to the above aspect, as an approaching object is detected behind the vehicle by the radar while the vehicle is moving backward, at the time when driving assistance for avoiding a collision with the approaching object is executed, the driving assistance is restricted or prohibited on the condition that the distance to the approaching object is larger by the predetermined value or more than the distance to the screen. Thus, it is possible to prevent or reduce erroneous activation of driving assistance for avoiding a collision due to detection of a mirror ghost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
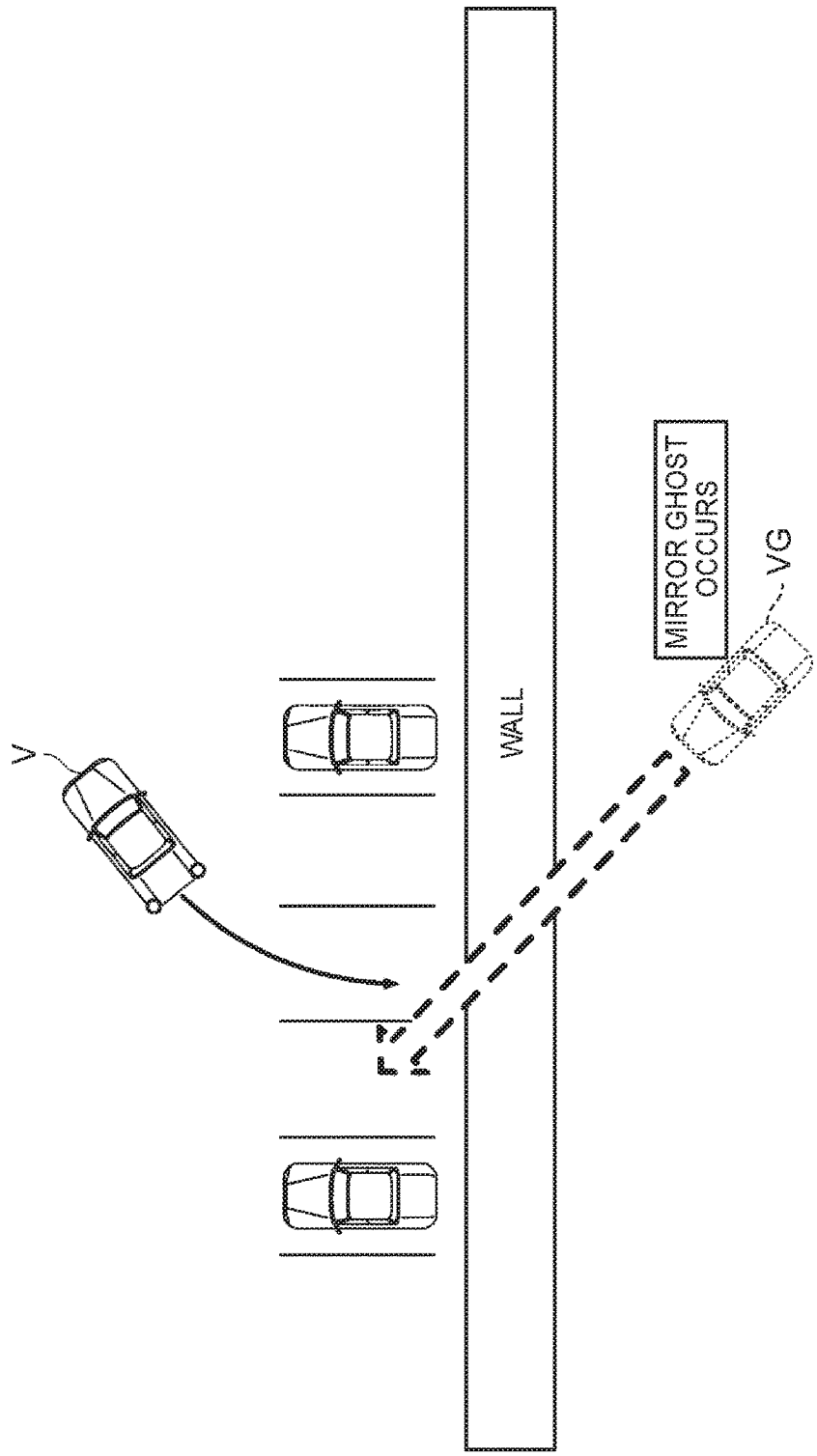
FIG. 1 is a conceptual view that illustrates a situation in which a mirror ghost occurs.
Figure 2:
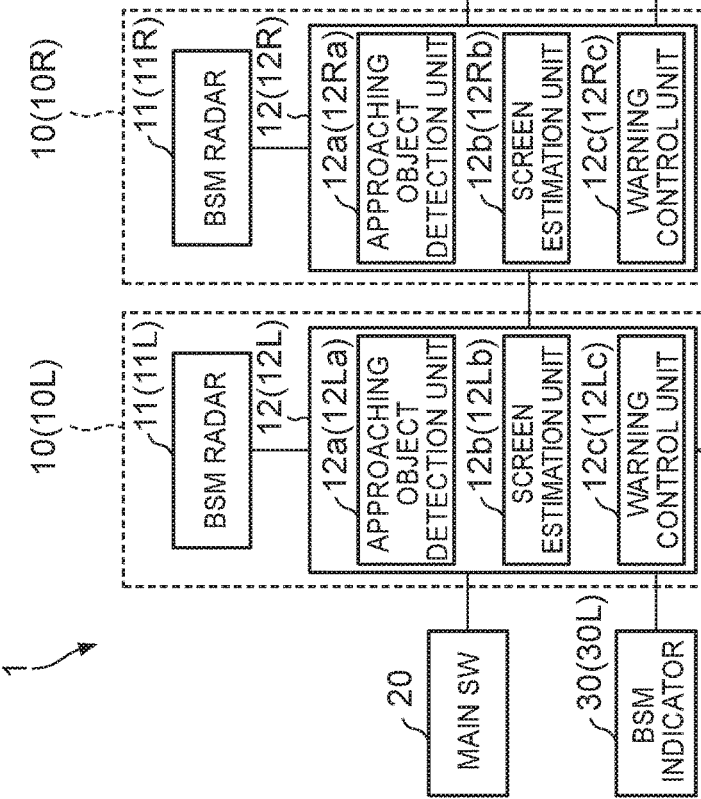
FIG. 2 is a block diagram that shows an example of the configuration of a proximity warning device.

FIG. 2 is a block diagram that shows an example of the configuration of a proximity warning device 1 according to the present embodiment.

The proximity warning device 1 is an example of a collision avoidance system that executes driving assistance for, while a vehicle is moving backward, detecting an object (approaching object) that approaches from behind the vehicle with the use of radars and avoiding a collision with the approaching object. The proximity warning device 1 is mounted on the vehicle 100. As the proximity warning device 1 detects an object (such as a vehicle, a bicycle, a pedestrian, or the like) that approaches the vehicle 100 from behind the vehicle 100 while the vehicle 100 is moving backward, the proximity warning device 1 issues an alarm to a driver (proximity warning). Thus, for example, when the vehicle 100 exits backward in a state where the vehicle 100 is parked forward in a parking space, it is possible to call attention to an approaching object that cannot be visually recognized by the driver due to the presence of other parked vehicles, so it is possible to avoid contact, collision, or the like, with the approaching object.

The phrase "behind the vehicle 100" in the present embodiment means the rear to the rear end of the vehicle 100 in the longitudinal direction, and is used as not only the meaning of a direction straight behind the vehicle 100 but also the meaning of the rear sides (diagonally backward sides) of the vehicle 100. The proximity warning function is activated when a main switch (referred to as main SW) 20 (described later) is in an ON state. Hereinafter, unless otherwise specified, description will be made on the assumption that the main SW 20 is in the ON state.

The proximity warning device 1 includes blind spot monitoring (BSM) modules 10, the main SW 20, BSM indicators 30, a BSM buzzer 40, clearance sonars 50, a clearance sonar electronic control unit (ECU) 60, a vehicle speed sensor 70, a shift position sensor 80, and the like.

Each of the BSM modules 10 includes a BSM radar 11 and a BSM-ECU 12. Each BSM module 10 detects an object (approaching object) that approaches the vehicle 100 from the corresponding rear side, and issues an alarm when the BSM module 10 has detected the approaching object. The BSM modules 10 include a BSM module 10L and a BSM module 10R. The BSM module 10L deals with an approaching object from a left rear side behind the vehicle 100. The BSM module 10R deals with an approaching object from a right rear side behind the vehicle 100.

Figure 3:
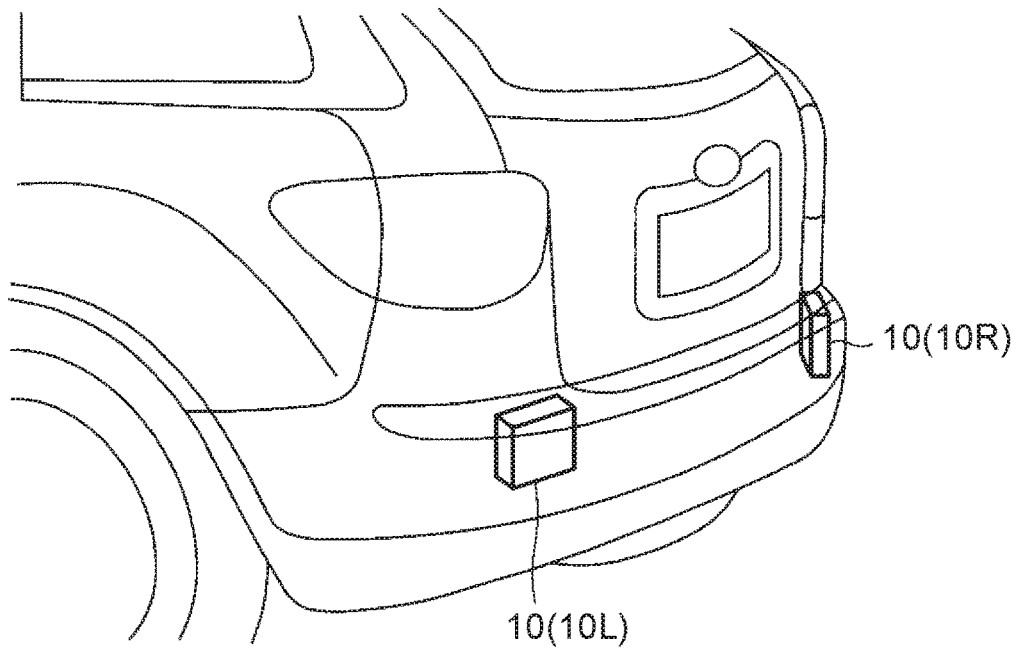
FIG. 3 is a view that shows an example of vehicle-mounted positions of BSM modules.

FIG. 3 is a view that shows an example of vehicle-mounted positions of the BSM modules 10R, 10L. As shown in FIG. 3, the BSM modules 10R, 10L are respectively attached to the right end and left end inside a rear bumper of the vehicle 100.

Referring back to FIG. 2, each of the BSM radars 11 is object detection means for detecting an object that is located behind the vehicle 100. Specifically, each BSM radar 11 transmits a detection wave (for example, a 26 GHz band millimeter wave) toward a predetermined range behind the vehicle 100, and then receives a reflected wave corresponding to the detection wave. Thus, each BSM radar 11 detects an object that is located behind the vehicle 100. Each BSM radar 11, for example, detects (calculates) the distance from the vehicle 100 to the object (hereinafter, simply referred to as the distance to the object) and the relative velocity of the object with respect to the vehicle 100 (hereinafter, simply referred to as the relative velocity of the object) in a frequency modulated-continuous wave (FM-CW) mode. The BSM radar 11 detects (calculates) the orientation of the object on the basis of a phase difference between reflected waves that are respectively received by a plurality of receiving antennas. That is, each BSM radar 11 detects (calculates) the relative position of the object with respect to the vehicle 100 (hereinafter, simply referred to as the relative position of the object) and the relative velocity of the object with respect to the vehicle 100. Each BSM radar 11 detects (calculates) the size (width) of the object on the basis of reflected waves that are received in multiple directions.

The BSM radars 11 include BSM radars 11R, 11L respectively corresponding to the BSM modules 10R, 10L. The BSM radar 11L detects an object that is located to the left rear side of the vehicle 100, and detects (calculates) the relative position and relative velocity of the detected object. Similarly, the BSM radar 11R detects an object that is located to the right rear side of the vehicle 100, and detects (calculates) the relative position and relative velocity of the detected object.

The BSM radars 11R, 11L are, for example, respectively communicably connected to BSM-ECUs 12R, 12L (described later) via one-to-one correspondence communication lines (direct lines), or the like. The BSM radar 11R transmits information (radar information) about a detected object including the relative position, relative velocity, size, and the like, to the BSM-ECU 12R. The BSM radar 11L transmits information (radar information) about a detected object including the relative position, relative velocity, size, and the like, to the BSM-ECU 12L.

Each of the BSM-ECUs 12 is an electronic control unit that executes main control processing in the proximity warning device 1. The BSM-ECUs 12 include the BSM-ECUs 12R, 12L respectively corresponding to the BSM modules 10R, 10L.

Each of the BSM-ECUs 12 (12R, 12L) is, for example, formed of a microcomputer, or the like, and executes various control processing by executing various programs stored in a ROM on a CPU. Each of the BSM-ECUs 12 includes an approaching object detection unit 12a, a screen estimation unit 12b and a warning control unit 12c as functional units that are implemented by executing corresponding programs on the CPU.

The approaching object detection units 12a include approaching object detection units 12Ra, 12La respectively corresponding to the BSM-ECUs 12R, 12L. Each approaching object detection unit 12a detects an object that approaches the vehicle 100 from among objects detected by the corresponding one of the BSM radars 11 (11R, 11L). That is, each of the approaching object detection units 12a (12Ra, 12La) determines whether an object detected by the corresponding one of the BSM radars 11 (11R, 11L) is an approaching object. Specifically, the approaching object detection unit 12La detects an approaching object that approaches the vehicle 100 from the left rear side on the basis of radar information that is received from the BSM radar 11L, and the approaching object detection unit 12Ra detects an approaching object that approaches the vehicle 100 from the right rear side on the basis of radar information that is received from the BSM radar 11R.

Each of the approaching object detection units 12a (12Ra, 12La) may determine whether an object detected by the corresponding one of the BSM radars 11 (11R, 11L) is an approaching object by the use of any technique. For example, whether a detected object is an approaching object may be determined by calculating the moving velocity of the detected object on the basis of the vehicle speed of the vehicle 100, detected by the vehicle speed sensor 70 (described later), and the relative velocity of the object, detected by the BSM radars 11.

Each of the screen estimation units 12b estimates whether there is a screen (an object that blocks an approach to the vehicle 100), such as a wall, behind the vehicle 100 on the basis of clearance sonar information that is transmitted from the corresponding clearance sonars 50 (described later). When any one of the screen estimation units 12b estimates that there is a screen, the any one of the screen estimation units 12b sets a screening line (for example, a line that indicates a mode in which the screen, such as a wall, extends in plan view) corresponding to the screen. The screen estimation units 12b include screen estimation units 12Rb, 12Lb respectively corresponding to the BSM-ECUs 12R, 12L. The detailed process that is executed by the screen estimation units 12b (12Rb, 12Lb) will be described later.

While the vehicle 100 is moving backward, when an approaching object has been detected by any one of the approaching object detection units 12a from among objects detected by the corresponding BSM radar 11, the corresponding warning control unit 12c issues an alarm indicating the presence of the approaching object by controlling the corresponding BSM indicator 30 and the BSM buzzer 40. Specifically, the warning control units 12c are communicably connected to the BSM indicators 30 and the BSM buzzer 40 via direct lines, or the like. Each of the warning control units 12c issues an alarm informing the driver of the vehicle 100 of the presence of the approaching object by transmitting an activation signal to the corresponding BSM indicator 30 and the BSM buzzer 40. While the vehicle 100 is moving backward and the alarm is being activated, when the approaching object is not detected by the any one of the approaching object detection units 12a any more, the corresponding warning control unit 12c stops the alarm using the corresponding BSM indicator 30 and the BSM buzzer 40. Specifically, the corresponding warning control unit 12c transmits a deactivation signal to the corresponding BSM indicator 30 and the BSM buzzer 40.

The warning control units 12c include warning control units 12Rc, 12Lc respectively corresponding to the BSM-ECUs 12R, 12L.

When an approaching object that is located to the left rear side of the vehicle 100 has been detected by the approaching object detection unit 12La, the warning control unit 12Lc issues an alarm indicating that there is an approaching object to the left rear side of the vehicle 100. Specifically, the warning control unit 12Lc issues the alarm by transmitting an activation signal to the BSM indicator 30L (described later) included in the BSM indicators 30, and the BSM buzzer 40. Similarly, when an approaching object that is located to the right rear side of the vehicle 100 has been detected by the approaching object detection unit 12Ra, the warning control unit 12Rc issues an alarm indicating that there is an approaching object to the right rear side of the vehicle 100. Specifically, the warning control unit 12Rc issues the alarm by transmitting an activation signal to the BSM indicator 30R (described later) included in the BSM indicators 30, and the BSM buzzer 40. Thus, the driver of the vehicle 100 recognizes the presence of an approaching object that approaches from behind through a buzzer sound from the BSM buzzer 40, and also recognizes to which one of the right rear side and the left rear side the approaching object is present on the basis of which one of the BSM indicators 30R, 30L is activated.

While the vehicle 100 is moving backward and the alarm is being activated, when the approaching object that is located to the left rear side of the vehicle 100 is not detected by the approaching object detection unit 12La any more, the warning control unit 12Lc stops the alarm indicating that there is the approaching object to the left rear side of the vehicle 100. Specifically, the warning control unit 12Lc stops the alarm by transmitting a deactivation signal to the BSM indicator 30L and the BSM buzzer 40. While the vehicle 100 is moving backward and the alarm is being activated, when the approaching object that is located to the right rear side of the vehicle 100 is not detected by the approaching object detection unit 12Ra any more, the warning control unit 12Rc stops the alarm indicating that there is the approaching object to the right rear side of the vehicle 100. Specifically, the warning control unit 12Rc stops the alarm by transmitting a deactivation signal to the BSM indicator 30R and the BSM buzzer 40.

The BSM-ECUs 12R, 12L are connected to an in-vehicle LAN 90 in a master-slave mode. That is, there is such a relationship that the BSM-ECU 12L is a master and the BSM-ECU 12R is a slave, the BSM-ECU 12L is connected to the in-vehicle LAN 90, and the BSM-ECU 12R is connected to the BSM-ECU 12L via a direct line. As will be described later, the BSM buzzer 40 is communicably connected to the BSM-ECU 12R via a direct line, so the BSM-ECU 12L transmits an activation signal or a deactivation signal to the BSM buzzer 40 via the BSM-ECU 12R. The BSM-ECU 12R is able to determine whether an alarm is being activated by the warning control unit 12Lc on the basis of an activation signal or a deactivation signal that is received from the BSM-ECU 12L. When an alarm is being activated by the warning control unit 12Lc, the warning control unit 12Rc does not output a deactivation signal to the BSM buzzer 40. Similarly, when an alarm is being activated by the warning control unit 12Rc, the BSM-ECU 12R does not transmit a deactivation signal to the BSM buzzer 40 if the BSM-ECU 12R receives the deactivation signal for the BSM buzzer 40 from the warning control unit 12Lc. This is because the BSM buzzer 40 is used as not only an alarm for an approaching object that is located to the left rear side but also an alarm for an approaching object that is located to the right rear side.

When the presence of a screen is estimated by any one of the screen estimation units 12b (12Rb, 12Lb) and a predetermined condition regarding the screen is satisfied, the corresponding one of the warning control units 12c (1Rc, 12Lc) restricts or prohibits issuing an alarm. Detailed operation will be described later.

Figure 4:
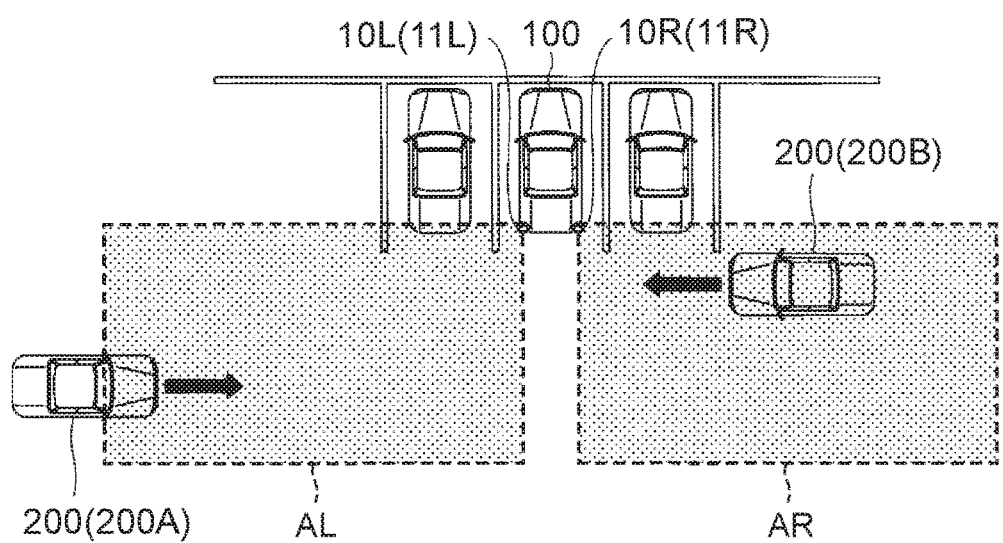
FIG. 4 is a view that shows an example of detection ranges of BSM radars.

FIG. 4 is a view that illustrates the proximity warning function.

As shown in FIG. 4, the BSM radar 11R detects an object (another vehicle 200 in the drawing) that is located within a detection area AR to the right rear side of the vehicle 100, and the BSM radar 11L detects an object (another vehicle 200 in the drawing) that is located within a detection area AL to the left rear side of the vehicle 100. In the present embodiment, the detection area AR of the BSM radar 11R is a rectangular area having a long side extending outward from the BSM radar 11R in the vehicle width direction and a short side extending rearward in plan view, and the detection area AL of the BSM radar 11L is a rectangular area having a long side extending outward from the BSM radar 11L in the vehicle width direction and a short side extending rearward in plan view. That is, the detection areas AR, AL of the BSM radars 11R, 11L are set on the assumption that another vehicle that travels on a passage zone in a parking lot and approaches the vehicle 100. The BSM radar 11R detects another vehicle 200B that is located within the detection area AR. The BSM radar 11L detects another vehicle 200A that is located within the detection area AL.

The detection areas of the BSM radars 11R, 11L in the present embodiment are one example, and may be, for example, set such that at least one of the detection areas of the BSM radars 11R, 11L includes an area straight behind the vehicle 100. That is, the detection areas of the BSM radars 11R, 11L are set as needed so as to include an area in which the presence of an approaching object is intended to be detected behind the vehicle 100.

The other vehicles 200A, 200B both are traveling toward the vehicle 100, so the approaching object detection unit 12Ra detects the vehicle 200B as an approaching object (determines the vehicle 200B as an approaching object), and the approaching object detection unit 12La detects the vehicle 200A as an approaching object (determines the vehicle 200A as an approaching object). The warning control unit 12Rc issues an alarm using the corresponding BSM indicator 30 (30R) and the BSM buzzer 40, and the warning control unit 12Lc issues an alarm using the corresponding BSM indicator 30 (30L) and the BSM buzzer 40.

As shown in FIG. 4, because the vehicle 200B enters the detection area AR before the vehicle 200A enters the detection area AL, so the BSM buzzer 40 starts to be activated in response to an activation signal from the BSM-ECU 12R (warning control unit 12Rc).

Referring back to FIG. 2, the main SW 20 is startup/stop operation means for allowing the driver to start up or cancel the proximity warning function. The main SW 20 is communicably connected to the BSM module 10 (BSM-ECU 12L) via a direct line, or the like, and transmits a signal (startup signal/stop signal) corresponding to the ON state (startup) or OFF state (stop) of the main SW 20 to the BSM-ECU 12L.

As the BSM-ECU 12L receives the startup signal or the stop signal from the main SW 20, the BSM-ECU 12L starts up or stops its own proximity warning function (corresponding application), and transfers the startup signal or the stop signal to the BSM-ECU 12R. As the BSM-ECU 12R receives the startup signal or the stop signal from the BSM-ECU 12L, the BSM-ECU 12R starts up or stops its own proximity warning function (corresponding application).

Each of the BSM indicators 30 is alarm means for alarming that there is an approaching object that approaches the vehicle 100 from behind by displaying an indicator (text, graphic, symbol, or the like). The BSM indicators 30 include the BSM indicators 30R, 30L respectively corresponding to the BSM modules 10R, 10L. That is, the BSM indicator 30L indicates the presence of an approaching object that is located to the left rear side of the vehicle 100, and the BSM indicator 30R indicates the presence of an approaching object that is located to the right rear side of the vehicle 100. The BSM indicators 30 (30R, 30L) are provided at a position that is visually easily recognized by the driver of the vehicle 100. For example, the BSM indicators 30R, 30L may be provided in a display area within a meter. The BSM indicators 30R, 30L may be respectively provided in display areas of mirror portions in right and left door mirrors. The BSM indicator 30R turns on or off an indicator in response to an activation signal or a deactivation signal that is received from the BSM-ECU 12R. The BSM indicator 30L turns on or off an indicator in response to an activation signal or a deactivation signal that is received from the BSM-ECU 12L.

The BSM buzzer 40 is alarm means for alarming the presence of an approaching object that approaches the vehicle 100 from behind by outputting a sound. The BSM buzzer 40 beeps a predetermined buzzer sound in response to an activation signal (including an activation signal that is output from the BSM-ECU 12L) that is received from the BSM-ECU 12R. As the BSM buzzer 40 receives a deactivation signal (including a deactivation signal that is output from the BSM-ECU 12L) from the BSM-ECU 12R during activation (during beeping), the BSM buzzer 40 stops beeping the predetermined buzzer sound.

The clearance sonars 50 are ultrasonic sensors. Each of the clearance sonars 50 detects an object that is located behind the vehicle 100 on the principle different from that of the BSM radars 11, and is an example of a distance sensor that detects the distance to a detected object. Each of the clearance sonars 50 transmits an ultrasonic wave to the rear of the vehicle 100 at predetermined intervals, and detects an object by receiving a reflected ultrasonic wave. Each of the clearance sonars 50 detects (calculates) the distance to a detected object on the basis of an elapsed time from transmission of an ultrasonic wave to reception of the ultrasonic wave. The clearance sonars 50 include two clearance sonars 50La, 50Lb and two clearance sonars 50Ra, 50Rb. The two clearance sonars 50La, 50Lb detect an object that is located to the left rear side of the vehicle 100. The two clearance sonars 50Ra, 50Rb detect an object that is located to the right rear side of the vehicle 100. The clearance sonars 50Ra, 50Rb, 50La, 50Lb each are communicably connected to the clearance sonar ECU 60 via a direct line, and each transmit clearance sonar information including, for example, the distance to a detected object to the clearance sonar ECU 60.

Figure 5:
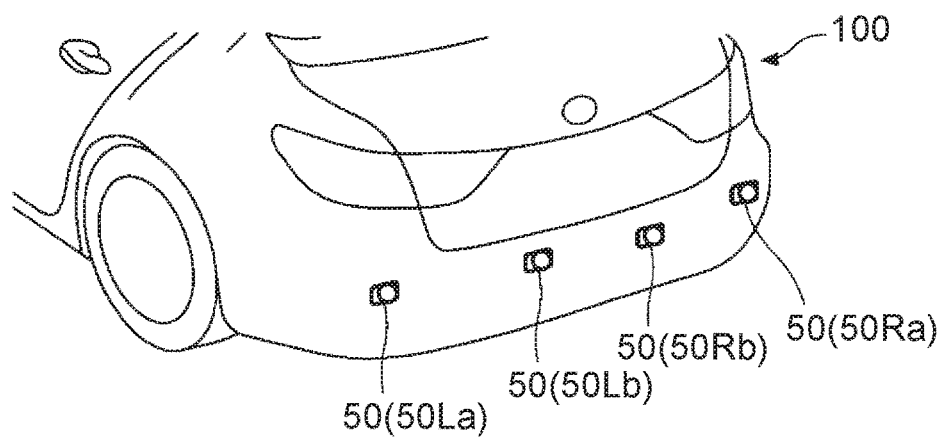
FIG. 5 is a view that shows an example of vehicle-mounted positions of clearance sonars.
Figure 6:
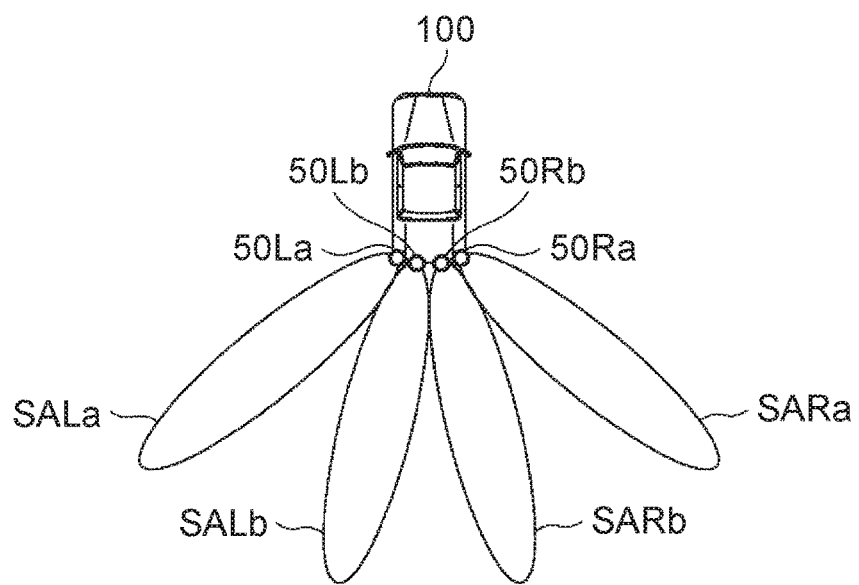
FIG. 6 is a conceptual view that shows an example of detection ranges of the clearance sonars.

FIG. 5 is a view that shows an example of the vehicle-mounted positions of the clearance sonars 50La, 50Lb, 50Ra, 50Rb. FIG. 6 is a conceptual view that shows an example of detection areas of the clearance sonars 50La, 50Lb, 50Ra, 50Rb.

As shown in FIG. 5, the clearance sonars 50Ra, 50La are respectively mounted at the right end and left end of the rear bumper of the vehicle 100 such that a transmission and reception unit for ultrasonic wave is exposed. The clearance sonar 50Lb is mounted between the left end and center of the rear bumper of the vehicle 100 such that a transmission and reception unit for ultrasonic wave is exposed. The clearance sonar 50Rb is mounted between the right end and center of the rear bumper of the vehicle 100 such that a transmission and reception unit for ultrasonic wave is exposed.

As shown in FIG. 6, the clearance sonars 50Ra, 50Rb, 50La, 50Lb respectively have detection areas SARa, SARb, SALa, SALb each extending substantially forward (the transmission direction of ultrasonic wave) with a relatively narrow width in plan view. In this way, each of the clearance sonars 50Ra, 50Rb, 50La, 50Lb is able to detect an object that is located substantially forward thereof by transmitting a high-directional ultrasonic wave. The clearance sonars 50Ra, 50Rb, 50La, 50Lb respectively have different detection areas, each are able to detect an object that is located in a different direction in plan view with respect to the vehicle 100.

Referring back to FIG. 2, the clearance sonar ECU 60 is an electronic control unit that executes predetermined driving assistance (for example, alarms abnormal closeness to an object that is present around the vehicle 100 while the vehicle 100 is traveling at a low speed) on the basis of clearance sonar information. The clearance sonar ECU 60 is, for example, formed of a microcomputer, or the like, and implements various control processing by executing various programs stored in a ROM on a CPU. The clearance sonar ECU 60 is communicably connected to the BSM module 10L (BSM-ECU 12L) via the in-vehicle LAN 90, and transmits clearance sonar information that is received from the clearance sonars 50Ra, 50Rb, 50La, 50Lb to the BSM module 10L.

As the BSM-ECU 12L receives clearance sonar information from the clearance sonar ECU 60, the BSM-ECU 12L transfers the clearance sonar information to the BSM-ECU 12R.

The vehicle speed sensor 70 is known vehicle speed detection means for detecting the vehicle speed of the vehicle 100. The vehicle speed sensor 70 is communicably connected to the BSM module 10L (BSM-ECU 12L) via the in-vehicle LAN 90, and transmits a detected signal corresponding to a detected vehicle speed (vehicle speed signal) to the BSM-ECU 12L.

Although not shown in FIG. 2, the vehicle speed sensor 70 is connected to the in-vehicle LAN 90 via an ECU that controls the vehicle speed sensor 70 (for example, a brake ECU). As the BSM-ECU 12L receives a vehicle speed signal from the vehicle speed sensor 70, the BSM-ECU 12L transfers the vehicle speed signal to the BSM-ECU 12R.

The shift position sensor 80 is known detection means for detecting a shift position of a transmission that shifts power from a driving force source of the vehicle 100, such as an engine and a motor, and then transmits the power to wheels. The shift position sensor 80 is communicably connected to the BSM module 10L (BSM-ECU 12L) via the in-vehicle LAN 90, and transmits a detected signal corresponding to a detected shift position (shift position signal) to the BSM module 10L.

Although not shown in FIG. 2, the shift position sensor 80 is connected to the in-vehicle LAN 90 via an ECU that controls the shift position sensor 80 (for example, a transmission ECU). The shift position includes a D (drive) range that is a forward drive position, an R (reverse) range that is a reverse drive position, and the like. As the BSM-ECU 12L receives a shift position signal from the shift position sensor 80, the BSM-ECU 12L transfers the shift position signal to the BSM-ECU 12R.

Next, the characterized operation of the proximity warning device 1 according to the present embodiment, that is, the control process (alarm activation process) according to the proximity warning function, will be described.

Figure 7:
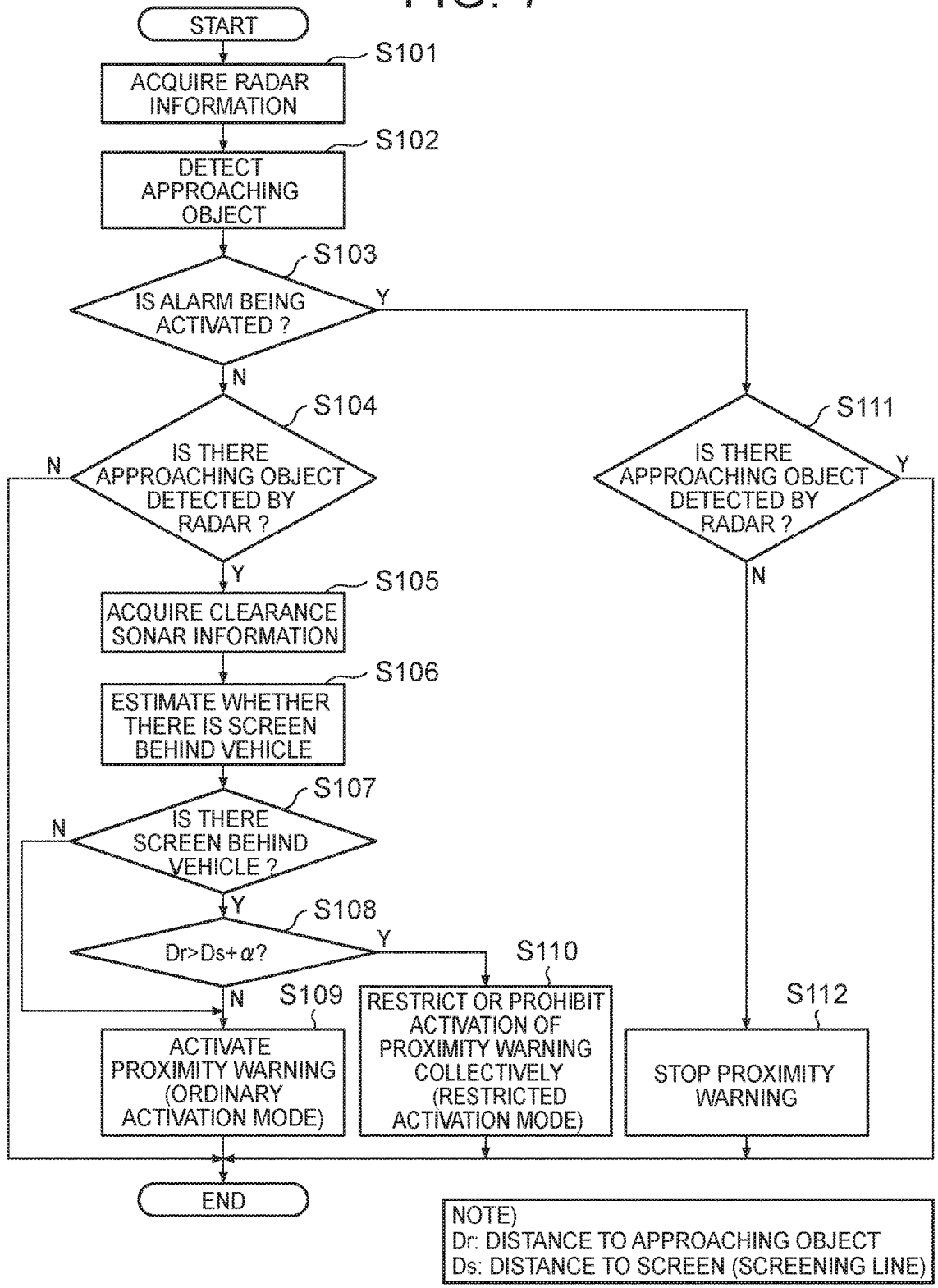
FIG. 7 is a flowchart that conceptually shows an example of alarm activation process that is executed by the proximity warning device (BSM-ECU)

FIG. 7 is a flowchart that conceptually shows an example of the alarm activation process that is executed by the proximity warning device 1 according to the present embodiment.

The process according to this flowchart is executed by each of the BSM-ECUs 12R, 12L. Each of the BSM-ECUs 12R, 12L repeatedly executes the flowchart at predetermined time intervals while the vehicle 100 is moving backward (when the shift position signal that is received from the shift position sensor 80 corresponds to the R range).

In step S101, the approaching object detection unit 12Ra acquires (reads) radar information, received from the BSM radar 11R and stored, from an internal memory, or the like, or the approaching object detection unit 12La acquires (reads) radar information, received from the BSM radar 11L and stored, from an internal memory, or the like.

In step S102, the approaching object detection unit 12Ra executes the process of detecting an approaching object that is present to the right rear side from among objects detected by the BSM radar 11R, or the approaching object detection unit 12La executes the process of detecting an approaching object that is present to the left rear side from among objects detected by the BSM radar 11L.

In step S103, the warning control unit 12Rc determines whether proximity warning resulting from the process of step S109 (described later) is being activated, or the warning control unit 12Lc determines whether proximity warning resulting from the process of step S109 (described later) is being activated. When the warning control unit 12Rc determines that the alarm is being activated, the process proceeds to step S104; whereas, when the warning control unit 12Rc determines that the alarm is not being activated, the process proceeds to step S111. Similarly, when the warning control unit 12Lc determines that the alarm is being activated, the process proceeds to step S104; whereas, when the warning control unit 12Lc determines that the alarm is not being activated, the process proceeds to step S111.

In step S104, the warning control units 12Rc determines whether an approaching object has been detected in the process of step S102, or the warning control units 12Lc determines whether an approaching object has been detected in the process of step S102. When the warning control unit 12Rc determines that there is an approaching object, the process proceeds to step S105; whereas, when the warning control unit 12Rc determines that there is no approaching object, the current process ends. Similarly, when the warning control unit 12Lc determines that there is an approaching object, the process proceeds to step S105; whereas, when the warning control unit 12Lc determines that there is no approaching object, the current process ends.

In step S105, the screen estimation units 12Rb acquires (reads) clearance sonar information, received from the clearance sonar ECU 60 and stored, from an internal memory, or the like, or the screen estimation units 12Lb acquires (reads) clearance sonar information, received from the clearance sonar ECU 60 and stored, from the internal memory, or the like.

In step S106, the screen estimation units 12Rb executes the process of estimating whether there is a screen behind the vehicle 100 on the basis of the clearance sonar information, or the screen estimation units 12Lb executes the process of estimating whether there is a screen behind the vehicle 100 on the basis of the clearance sonar information. Specifically, the screen estimation unit 12Rb determines whether objects have been detected by two or more of the clearance sonars 50 among the clearance sonars 50Ra, 50Rb, 50La, 50Lb on the basis of the clearance sonar information, or the screen estimation unit 12Lb determines whether objects have been detected by two or more of the clearance sonars 50 among the clearance sonars 50Ra, 50Rb, 50La, 50Lb on the basis of the clearance sonar information. When the screen estimation unit 12Rb determines that objects have been detected by two or more of the clearance sonars 50, the screen estimation unit 12Rb estimates that there is a screen behind the vehicle 100. Similarly, when the screen estimation unit 12Lb determines that objects have been detected by two or more of the clearance sonars 50, the screen estimation unit 12Lb estimates that there is a screen behind the vehicle 100. As described above, the clearance sonars 50Ra, 50Rb, 50La, 50Lb respectively have different detection areas in plan view, so, when objects have been detected by two or more of the clearance sonars 50, it may be determined that a screen having a certain width is highly likely to be present behind the vehicle 100. When the screen estimation unit 12Rb estimates that there is a screen, the screen estimation unit 12Rb sets a screening line corresponding to the screen on the basis of the distances to the objects that are detected by the clearance sonars 50 that have detected the objects. Similarly, when the screen estimation unit 12Lb estimates that there is a screen, the screen estimation unit 12Lb sets a screening line corresponding to the screen on the basis of the distances to the objects that are detected by the clearance sonars 50 that have detected the objects. For example, when objects have been detected by two of the clearance sonars 50, the positions of the objects in the forward directions of the two of the clearance sonars 50 are allowed to be identified on the basis of the distances to the corresponding objects, so a straight line that connects the positions of the two objects in plan view may be set as a screening line. When objects have been detected by three or more of the clearance sonars 50 as well, similarly, a polygonal line that is generated by, for example, sequentially connecting the positions of the laterally adjacent objects detected by the three or more of the clearance sonars 50 in plan view may be set as a screening line.

In step S107, the warning control unit 12Rc determines whether there is a screen behind the vehicle 100, that is, whether the screen estimation unit 12Rb has estimated that there is a screen behind the vehicle 100, or the warning control unit 12Lc determines whether there is a screen behind the vehicle 100, that is, whether the screen estimation unit 12Lb has estimated that there is a screen behind the vehicle 100. When the warning control unit 12Rc determines that there is a screen behind the vehicle 100, the process proceeds to step S108; whereas, when the warning control unit 12Rc determines that there is no screen, the process proceeds to step S109. Similarly, when the warning control unit 12Lc determines that there is a screen behind the vehicle 100, the process proceeds to step S108; whereas, when the warning control unit 12Lc determines that there is no screen, the process proceeds to step S109.

In step S108, the warning control unit 12Rc determines whether the approaching object detected in the process of step S102 is sufficiently far from the screen behind the vehicle 100, estimated in the process of step S106, or the warning control unit 12Lc determines whether the approaching object detected in the process of step S102 is sufficiently far from the screen behind the vehicle 100, estimated in the process of step S106. Specifically, the warning control unit 12Rc determines whether a distance Dr to the approaching object detected by the BSM radar 11R is larger by a predetermined value $\alpha$ (>0) or more than a distance Ds to the screening line (for example, a distance to the screening line in the direction in which the approaching object is present when viewed from the vehicle 100), or the warning control unit 12Lc determines whether a distance Dr to the approaching object detected by the BSM radar 11L is larger by the predetermined value $\alpha$ (>0) or more than a distance Ds to the screening line (for example, a distance to the screening line in the direction in which the approaching object is present when viewed from the vehicle 100). When the warning control unit 12Rc determines that the determination condition is not satisfied, the process proceeds to step S109; whereas, when the warning control unit 12Rc determines that the determination condition is satisfied, the process proceeds to step S110. Similarly, when the warning control unit 12Lc determines that the determination condition is not satisfied, the process proceeds to step S109; whereas, when the warning control unit 12Lc determines that the determination condition is satisfied, the process proceeds to step S110.

The predetermined value α is an adapted value that is determined as needed on the basis of experiment, simulation, or the like. The predetermined value α is determined in consideration of possible errors in the BSM radars 11 and the clearance sonars 50.

In step S109, the warning control unit 12Rc issues an alarm that prompts attention to the detected approaching object by controlling the corresponding BSM indicator 30 (30R) and the BSM buzzer 40 (ordinary activation mode), or the warning control unit 12Lc issues an alarm that prompts attention to the detected approaching object by controlling the corresponding BSM indicator 30 (30L) and the BSM buzzer 40 (ordinary activation mode).

On the other hand, in step S110, the warning control unit 12Rc proceeds to a restricted activation mode, restricts or prohibits an alarm using the BSM indicators 30 (30R, 30L) and the BSM buzzer 40 collectively, and ends the current process, or the warning control unit 12Lc proceeds to a restricted activation mode, restricts or prohibits an alarm using the BSM indicators 30 (30R, 30L) and the BSM buzzer 40 collectively, and ends the current process.

Restricting an alarm may be, for example, only not issuing an alarm that indicates the presence of the approaching object detected in the process of step S102. Alternatively, restricting an alarm may be configured as such a mode in which only the BSM indicators 30 are activated and the BSM buzzer 40 is not activated only in issuing an alarm that indicates the presence of the approaching object detected in the process of step S102. Alternatively, restricting an alarm may be configured as such a mode in which, until the restricted activation mode is cancelled, when an approaching object has been detected in the process of step S102, an alarm using only the BSM indicators 30 is issued and an alarm using the BSM buzzer 40 is not issued. Prohibiting an alarm, for example, means not issuing an alarm about any approaching object until the restricted activation mode is cancelled. Restricting or prohibiting collectively means that, as any one of the BSM-ECUs 12R, 12L (warning control units 12Rc, 12Lc) shifts into the restricted activation mode, the other one also shifts into the restricted activation mode. As any one of the BSM-ECUs 12R, 12L (any one of the warning control units 12Rc, 12Lc) shifts into the restricted activation mode, a restricted activation flag F provided common to the BSM-ECUs 12R, 12L (warning control units 12Rc, 12Lc) in advance is set to an ON state. After the restricted activation flag F is set to the ON state, when the shift position becomes not the R range or the approaching object is not detected by any of the approaching object detection units 12Ra, 12La any more, the restricted activation flag F is set to an OFF state. After the restricted activation flag F is set to the ON state, when the process of step S108 is executed by one of the warning control units 12Rc, 12Lc, which has executed the process that is a trigger to shift into the restricted activation mode (the process of step S109) as well, the restricted activation flag F is set to the OFF state. That is, in these cases, both the warning control units 12Rc, 12Lc shift into the ordinary activation mode.

In step S111, the warning control unit 12Rc determines whether an approaching object has been detected in the process of step S102, or the warning control unit 12Lc determines whether an approaching object has been detected in the process of step S102. When the warning control unit 12Rc determines that there is no approaching object, the process proceeds to step S112; whereas, when the warning control unit 12Rc determines that there is an approaching object, the current process ends. Similarly, when the warning control unit 12Lc determines that there is no approaching object, the process proceeds to step S112; whereas, when the warning control unit 12Lc determines that there is an approaching object, the current process ends.

In step S112, the warning control unit 12Rc stops the alarm using the corresponding BSM indicator 30 (30R) and the BSM buzzer 40, and ends the current process, or the warning control unit 12Lc stops the alarm using the corresponding BSM indicator 30 (30L) and the BSM buzzer 40, and ends the current process.

The operation of the present embodiment (embodiment shown in FIG. 7) will be described with reference to FIG. 8.

Figure 8:
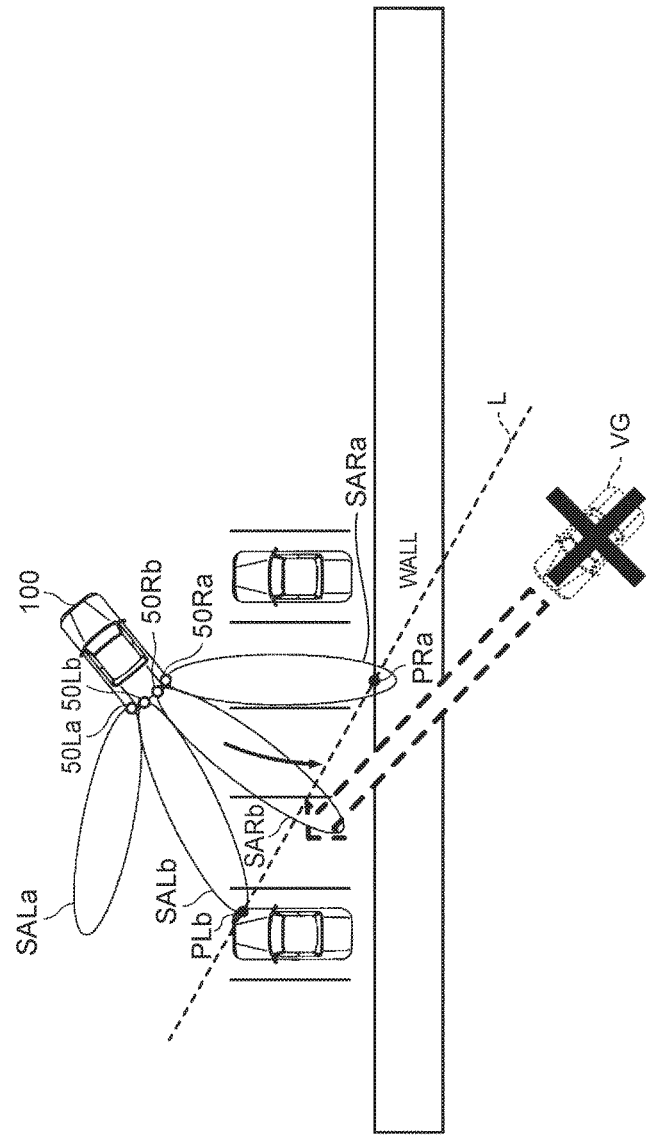
FIG. 8 is a view that illustrates the operation of the proximity warning device according to an embodiment shown in FIG. 7.

FIG. 8 is a view that illustrates the operation of the proximity warning device 1 according to the embodiment shown in FIG. 7. Specifically, FIG. 8 shows a situation that the driver parks the vehicle 100 backward to a parking space behind which a wall is present while the driver turns the steering wheel to the right.

In such a situation, as described above, a radio wave transmitted from the BSM radar 11 (11R) is, for example, multiply reflected from the wall, another vehicle, or the like, and then received by the BSM radar 11 (11R), with the result that a mirror ghost VG that approaches from the far side of the wall may be detected as an approaching object.

In the present embodiment, the clearance sonars 50 (50Ra, 50Rb, 50La, 50Lb) are provided. Each of the clearance sonars 50 (50Ra, 50Rb, 50La, 50Lb) similarly detects an object that is located behind the vehicle 100 on the principle different from that of the BSM radars 11, and also detects the distance to the detected object. For this reason, for example, as shown in FIG. 8, the clearance sonar 50Lb is able to detect a reflection point PLb corresponding to another vehicle that is parked in front of the wall, and the clearance sonar 50Ra is able to detect a reflection point PRa corresponding to the wall. In this way, when objects are detected by two or more of the clearance sonars 50Ra, 50Rb, 50La, 50Lb, it may be determined that a screen having a certain width is highly likely to be present behind the vehicle 100. For this reason, the screen estimation unit 12b (12Rb) estimates that there is a screen, and sets a screening line L (a line that connects the reflection points PLb, PRa in plan view) corresponding to the screen.

As shown in FIG. 8, the mirror ghost VG occurs because of the fact that a reflected wave reflected from the screen (wall) does not directly return to the BSM radar 11R but is multiply reflected or diffracted and then received by the BSM radar 11R, and the mirror ghost VG is detected as an approaching object that is present on the far side of the screen. That is, when the approaching object detected by the BSM radar 11R is present on the far side of the screen estimated by the screen estimation unit 12b, it may be determined that the mirror ghost VG as an approaching object is highly likely to have been detected.

Therefore, when the distance Dr to the approaching object is larger by the predetermined value α or more than the distance Ds to the screen (screening line L) that is estimated to be present by the screen estimation unit 12b (12Rb), issuing an alarm is restricted or prohibited. Thus, it is possible to prevent or suppress erroneous alarm due to detection of the mirror ghost VG In the present embodiment, as any one of the warning control units 12Rc, 12Lc shifts into the restricted activation mode due to the presence of a screen behind the vehicle 100, the other one also shifts into the restricted activation mode. Thus, in a situation that the mirror ghost VG easily occurs because of the screen that is estimated to be present behind the vehicle 100, it is possible to reliably prevent or reduce erroneous alarm due to occurrence of a mirror ghost.

As shown in FIG. 8, each of the screen estimation units 12b (12Rb, 12Lb) may estimate an object (a parked vehicle, a pole, or the like) present closer to the vehicle 100 than an actual screen (wall) as part of the screen. However, even when a parked vehicle, or the like, that is present closer to the vehicle 100 than the wall that is the actual screen is recognized as one point of the screen, it is extremely less likely that a vehicle, or the like, approaches from between the wall and the parked vehicle, or the like, so it is extremely less likely to present a problem even when issuing an alarm is restricted or prohibited on the basis of the screen.

In a situation in which the screen (wall) is relatively low, an approaching object that is actually present on the far side of the screen can be detected by the BSM radars 11. However, if an alarm about the approaching object is restricted or prohibited on the basis of the presence of the screen estimated by any one of the screen estimation units 12b, there is almost no possibility that the approaching object approaches the vehicle 100 across the screen, so it is extremely less likely to present a problem.

Figure 9:
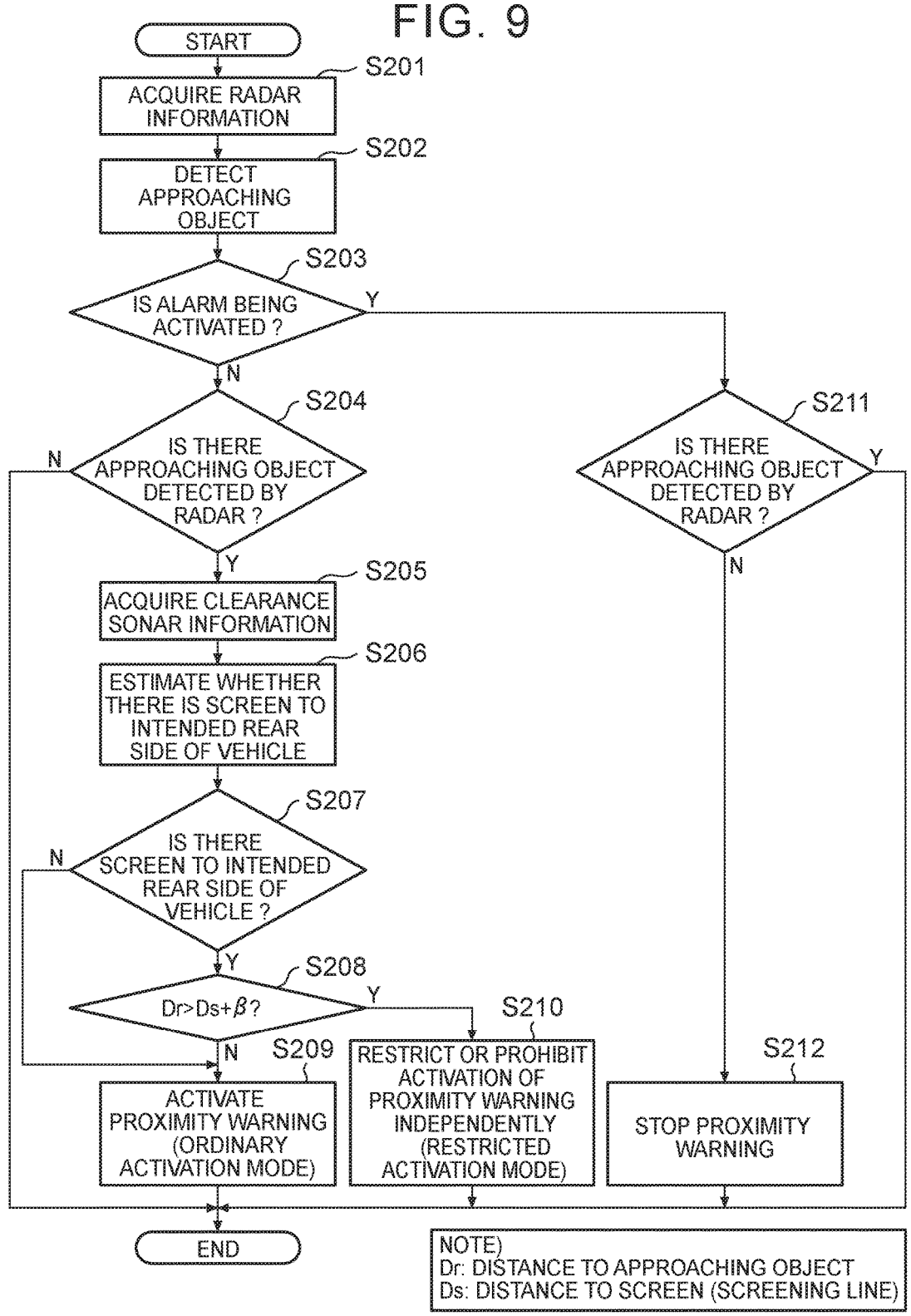
FIG. 9 is a flowchart that conceptually shows another example of alarm activation process that is executed by the proximity warning device (BSM-ECU)

Subsequently, FIG. 9 is a flowchart that conceptually shows another example of the proximity warning process that is executed by the proximity warning device 1 according to the present embodiment.

As in the case of FIG. 7, the process according to this flowchart is executed by each of the BSM-ECUs 12R, 12L. As in the case of FIG. 7, each of the BSM-ECUs 12R, 12L repeatedly executes the flowchart at predetermined time intervals while the vehicle 100 is moving backward (when the shift position signal that is received from the shift position sensor 80 corresponds to the R range).

As shown in FIG. 9, the processes of steps S201 to S205 and steps S211 to S212 are similar to the processes of steps S101 to S105 and steps S111 to S112 in FIG. 7, so the description thereof is omitted, and the other processes will be described.

In step S206, the screen estimation unit 12Rb executes the process of estimating whether there is a screen to the right rear side of the vehicle 100 on the basis of the clearance sonar information, or the screen estimation unit 12Lb executes the process of estimating whether there is a screen to the left rear side of the vehicle 100 on the basis of the clearance sonar information. More specifically, the screen estimation unit 12Lb determines whether objects have been detected by both the clearance sonars 50La, 50Lb that detect an object that is located to the left rear side of the vehicle 100, and, when objects have been detected by both, estimates that there is a screen to the left rear side of the vehicle 100. Similarly, the screen estimation unit 12Rb determines whether objects have been detected by both the clearance sonars 50Ra, 50Rb that detect an object that is located to the right rear side of the vehicle 100, and, when objects have been detected by both, estimates that there is a screen to the right rear side of the vehicle 100. When the screen estimation unit 12Rb estimates that there is a screen, the screen estimation unit 12Rb sets a screening line corresponding to the screen to the right rear side of the vehicle 100 on the basis of the distances to the objects that are detected by the clearance sonars 50Ra, 50Rb. Similarly, when the screen estimation unit 12Lb estimates that there is a screen, the screen estimation unit 12Lb sets a screening line corresponding to the screen to the left rear side of the vehicle 100 on the basis of the distances to the objects that are detected by the clearance sonars 50La, 50Lb.

In step S207, the warning control unit 12Rc determines whether there is a screen to the right rear side of the vehicle 100, or the warning control unit 12Lc determines whether there is a screen to the left rear side of the vehicle 100. That is, the warning control unit 12Rc determines whether it is estimated in the process of step S206 that there is a screen to the right rear side of the vehicle 100. Similarly, the warning control unit 12Lc determines whether it is estimated in the process of step S206 that there is a screen to the left rear side of the vehicle 100. When the warning control unit 12Rc determines that there is a screen to the right rear side of the vehicle 100, the process proceeds to step S208; whereas, when the warning control unit 12Rc determines that there is no screen, the process proceeds to step S209. Similarly, when the warning control unit 12Lc determines that there is a screen to the left rear side of the vehicle 100, the process proceeds to step S208; whereas, when the warning control unit 12Lc determines that there is no screen, the process proceeds to step S209.

In step S208, the warning control unit 12Rc determines whether the approaching object detected in the process of step S202 is sufficiently on the far side of the screen to the right rear side, estimated in the process of step S206, or the warning control unit 12Lc determines whether the approaching object detected in the process of step S202 is sufficiently on the far side of the screen to the left rear side, estimated in the process of step S206. More specifically, the warning control unit 12Rc determines whether the distance Dr to the approaching object detected by the BSM radar 11R is larger by a predetermined value β (>0) or more than the distance Ds to the screening line (for example, the distance to the screening line in the direction in which the approaching object is present when viewed from the vehicle 100). Similarly, the warning control unit 12Lc determines whether the distance Dr to the approaching object detected by the BSM radar 11L is larger by the predetermined value β (>0) or more than the distance Ds to the screening line (for example, the distance to the screening line in the direction in which the approaching object is present when viewed from the vehicle 100). When the warning control unit 12Rc determines that the determination condition is not satisfied, the process proceeds to step S209; whereas, when the warning control unit 12Rc determines that the determination condition is satisfied, the process proceeds to step S210. Similarly, when the warning control unit 12Lc determines that the determination condition is not satisfied, the process proceeds to step S209; whereas, when the warning control unit 12Lc determines that the determination condition is satisfied, the process proceeds to step S210.

The predetermined value β, as well as the predetermined value α, is an adapted value that is determined as needed on the basis of experiment, simulation, or the like. The predetermined value β, as well as the predetermined value α, is determined in consideration of possible errors in the BSM radars 11 and the clearance sonars 50.

In step S209, as well as step S109, the warning control unit 12Rc issues an alarm that prompts attention to the detected approaching object by controlling the corresponding BSM indicator 30 (30R) and the BSM buzzer 40 (ordinary activation mode), or the warning control unit 12Lc issues an alarm that prompts attention to the detected approaching object by controlling the corresponding BSM indicator 30 (30L) and the BSM buzzer 40 (ordinary activation mode).

On the other hand, in step S210, the warning control unit 12Rc proceeds to a restricted activation mode, restricts or prohibits an alarm using the corresponding BSM indicator 30 (30R) and the BSM buzzer 40 independently, and ends the current process, or the warning control unit 12Lc proceeds to a restricted activation mode, restricts or prohibits an alarm using the corresponding BSM indicator 30 (30L) and the BSM buzzer 40 independently, and ends the current process.

Restricting an alarm and prohibiting an alarm have similar meanings to those in the case of the above-described embodiment shown in FIG. 7. Restricting or prohibiting independently means that even when any one of the BSM-ECUs 12R, 12L (warning control units 12Rc, 12Lc) shifts into the restricted activation mode, the other one does not shift into the restricted activation mode. As the BSM-ECU 12R (warning control unit 12Rc) shifts into the restricted activation mode, a restricted activation flag FR provided for the BSM-ECU 12R (warning control unit 12Rc) in advance is set to an ON state. As the BSM-ECU 12L (warning control unit 12Lc) shifts into the restricted activation mode, a restricted activation flag FL provided for the BSM-ECU 12L (warning control unit 12Lc) in advance is set to an ON state. After the restricted activation flag FR is set to the ON state, when the shift position becomes not the R range, when the approaching object is not detected any more, or when the process of step S108 is executed, the restricted activation flag FR is set to an OFF state. Similarly, after the restricted activation flag FL is set to the ON state, when the shift position becomes not the R range, when the approaching object is not detected any more or when the process of step S108 is executed, the restricted activation flag FL is set to an OFF state. That is, in these cases, the BSM-ECU 12R (warning control unit 12Rc) shifts into the ordinary activation mode, or the BSM-ECU 12L (warning control unit 12Lc) shifts into the ordinary activation mode.

The operation of the present embodiment (FIG. 9) will be described with reference to FIG. 10.

Figure 10:
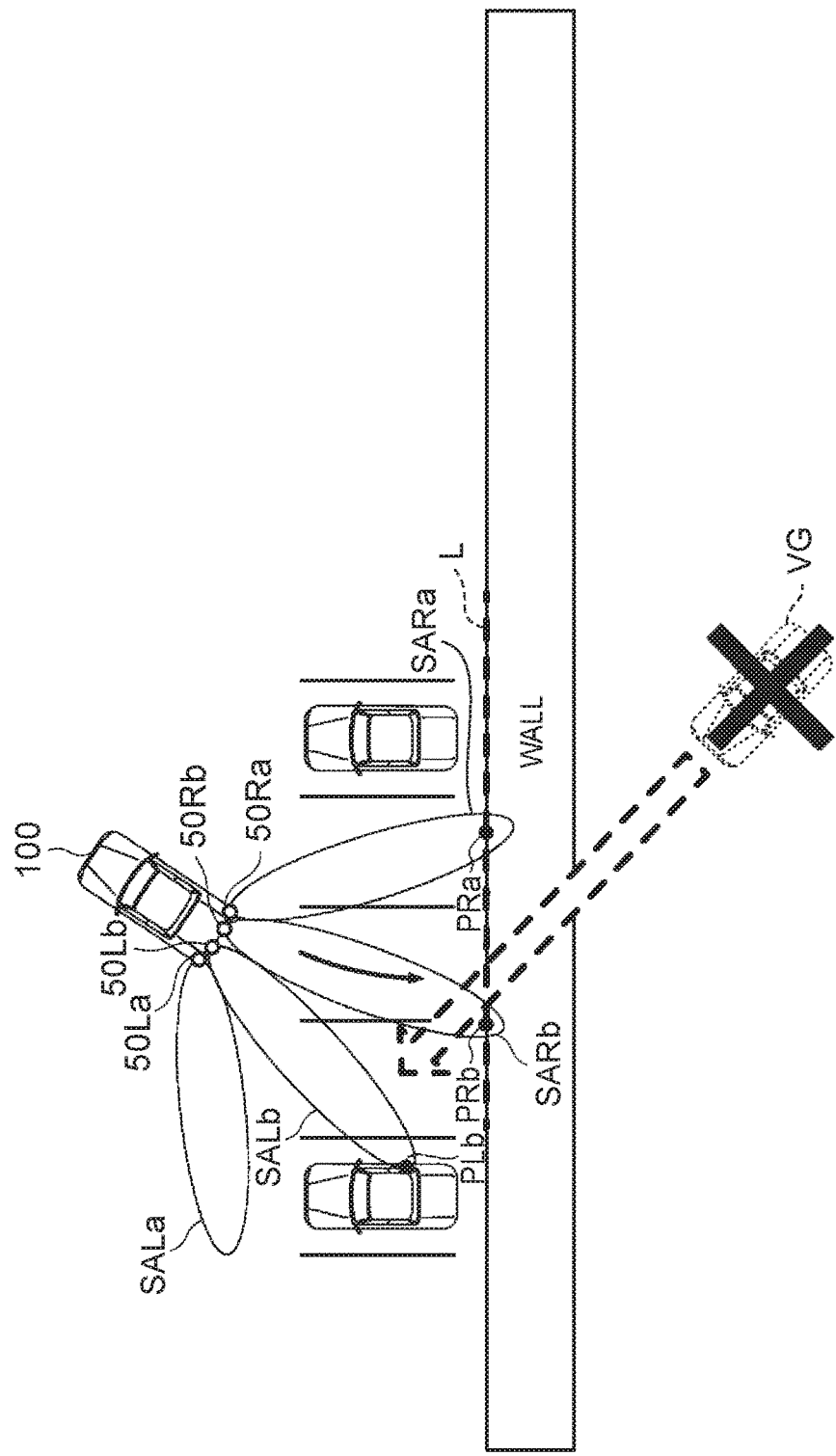
FIG. 10 is a view that illustrates the operation of the proximity warning device according to an embodiment shown in FIG. 9.

FIG. 10 is a view that illustrates the operation of the proximity warning device 1 according to the embodiment shown in FIG. 9. Specifically, as in the case of FIG. 8, FIG. 10 shows a situation that the driver parks the vehicle 100 backward to a parking space behind which a wall is present while the driver turns the steering wheel to the right. Hereinafter, advantageous effects specific to the present embodiment will be mainly described.

In such a situation, as in the case of FIG. 8, a mirror ghost VG that approaches from the right rear side of the vehicle 100 on the far side of the wall may be detected as an approaching object.

On the other hand, as shown in FIG. 10, when the driver parks the vehicle 100 backward by turning the steering wheel to the right, the left rear side of the vehicle 100 is a passage zone in front of the parking space, so another vehicle, or the like, may approach the vehicle 100 from the left rear side.

In the present embodiment, the screen estimation unit 12Lb estimates whether there is a screen that is located to the left rear side behind the vehicle 100 on the basis of the clearance sonar information from the clearance sonars 50La, 50Lb. Similarly, the screen estimation unit 12Rb estimates whether there is a screen that is located to the right rear side behind the vehicle 100 on the basis of the clearance sonar information from the clearance sonars 50Ra, 50Rb. The warning control unit 12Rc restricts or prohibits an alarm about an approaching object that is located to the right rear side on the basis of the right rear side screen estimated to be present by the screen estimation unit 12Rb, or the warning control unit 12Lc restricts or prohibits an alarm about an approaching object that is located to the left rear side on the basis of the left rear side screen estimated to be present by the screen estimation unit 12Lb. That is, in the present embodiment, the alarm activation process including restricting or prohibiting an alarm is independently executed by each of the warning control unit 12Lc corresponding to the approaching object from the left rear side of the vehicle 100 and the warning control unit 12Rc corresponding to the approaching object from the right rear side of the vehicle 100. Thus, even when an alarm about an approaching object that approaches the vehicle 100 from one of the right rear side and left rear side of the vehicle 100 is restricted or prohibited due to occurrence of a mirror ghost VG that approaches the vehicle 100 from the one of the right rear side and left rear side, it is possible to continue issuing an alarm about an approaching object that approaches from the other one of the right rear side and left rear side in the ordinary activation mode.

For example, as shown in FIG. 10, when reflection points PRa, PRb corresponding to a wall have been detected by the clearance sonars 50Ra, 50Rb, the screen estimation unit 12Rb estimates that there is a screen, and sets a screening line L (a line that connects the reflection points PRa, PRb in plan view). The warning control unit 12Rc is able to restrict or prohibit issuing an alarm on the basis of the positional relationship between the screening line L and a mirror ghost VG that is detected as an approaching object. On the other hand, the alarm activation process that is executed by the warning control unit 12Lc is executed independently of the alarm activation process that is executed by the warning control unit 12Rc (even when the warning control unit 12Rc shifts into the restricted activation mode, the warning control unit 12Lc does not shift into the restricted activation mode). For this reason, the warning control unit 12Lc is able to continuously issue an alarm about an approaching object that approaches from the left rear side of the vehicle 100 in the ordinary activation mode.

In the present embodiment, the number of the clearance sonars 50 having the detection areas set to the right rear side is two (the clearance sonars 50Ra, 50Rb), and the number of the clearance sonars 50 having the detection areas set to the left rear side is two (the clearance sonars 50La, 50Lb). Instead, the number of the clearance sonars 50 having the detection areas set to the right rear side may be three or more, and the number of the clearance sonars 50 having the detection areas set to the left rear side may be three or more. In this case, in step S206 of the present embodiment (FIG. 9), the screen estimation unit 12Rb estimates that there is a screen to the right rear side when objects have been detected by two or more of the clearance sonars 50 that are provided three or more in number and that detect an object to the right rear side, or the screen estimation unit 12Lb estimates that there is a screen to the left rear side when objects have been detected by two or more of the clearance sonars 50 that are provided three or more in number and that detect an object to the left rear side.

The embodiment of the invention is described in detail above; however, the invention is not limited to the above-described example embodiments. The embodiment of the invention may be variously modified or changed within the scope of the invention recited in the appended claims.

For example, as described above, the proximity warning function in the present embodiment is an example of driving assistance for avoiding a collision with an approaching object detected by a radar while the vehicle is moving backward. Therefore, the technique described in the above embodiment is applicable to any driving assistance for avoiding a collision with an approaching object detected by a radar while the vehicle is moving backward. For example, the above-described technique of the process of restricting or prohibiting proximity warning may be applied to driving assistance for, when there is an approaching object detected by a radar, for example, restricting driving force that is generated by a driving force source (engine, or the like) of the vehicle or generating braking force.

What is claimed is:

1. A collision avoidance system comprising:
    a radar that detects an object that is located behind a vehicle and that detects a distance to the detected object;
    a plurality of ultrasonic sensors, each of which detects the object and detects a distance to the object, the plurality of ultrasonic sensors respectively having different detection areas;
    an approaching object detection unit that detects an approaching object that approaches the vehicle from among objects that are detected by the radar;
    a screen estimation unit that, when objects have been detected by two or more of the plurality of ultrasonic sensors, estimates that there is a screen that blocks an approach to the vehicle from behind; and
    a control unit that, when the approaching object has been detected by the approaching object detection unit, executes driving assistance for avoiding a collision with the approaching object, and, when a distance to the approaching object is larger by a predetermined value or more than a distance to the screen, restricts or prohibits execution of the driving assistance.

2. The collision avoidance system according to claim 1, wherein
    the radar includes a first radar and a second radar, the first radar detects an object that is located to a left rear side of the vehicle, and the second radar detects an object that is located to a right rear side of the vehicle,
    the plurality of ultrasonic sensors include a plurality of first ultrasonic sensors and a plurality of second ultrasonic sensors, each of the plurality of first ultrasonic sensors detects an object that is located to the left rear side of the vehicle, and each of the plurality of second ultrasonic sensors detects an object that is located to the right rear side of the vehicle,
    the approaching object detection unit includes a first approaching object detection unit and a second approaching object detection unit, the first approaching object detection unit detects a first approaching object that is located to the left rear side of the vehicle and that approaches the vehicle from among objects detected by the first radar, and the second approaching object detection unit detects a second approaching object that is located to the right rear side of the vehicle and that approaches the vehicle from among objects detected by the second radar,
    the screen estimation unit includes a first screen estimation unit and a second screen estimation unit, the first screen estimation unit, when objects have been detected by two or more of the plurality of first ultrasonic sensors, estimates that there is a first screen that blocks an approach to the vehicle from the left rear side, and the second screen estimation unit, when objects have been detected by two or more of the plurality of second ultrasonic sensors, estimates that there is a second screen that blocks an approach to the vehicle from the right rear side, and
    the control unit includes a first control unit and a second control unit, the first control unit, when the first approaching object has been detected by the first approaching object detection unit, executes first driving assistance for avoiding a collision with the first approaching object and, when a distance to the first approaching object is larger by a predetermined value or more than a distance to the first screen, restricts or prohibits execution of the first driving assistance, and the second control unit, when the second approaching object has been detected by the second approaching object detection unit, executes second driving assistance for avoiding a collision with the second approaching object and, when a distance to the second approaching object is larger by a predetermined value or more than a distance to the second screen, restricts or prohibits execution of the second driving assistance.

3. A collision avoidance system comprising:
    a radar that detects an object that is located behind a vehicle and that detects a distance to the detected object;
    a plurality of ultrasonic sensors, each of which detects the object that is located behind the vehicle and detects a distance to the detected object, the plurality of ultrasonic sensors respectively having different detection areas; and
    an electronic control unit configured to identify an approaching object that approaches the vehicle from among objects that are detected by the radar, determine that there is a screen that blocks an approach to the vehicle from behind when objects have been detected by two or more of the plurality of ultrasonic sensors, and execute driving assistance for avoiding a collision with the approaching object when the approaching object has been detected, wherein
    the electronic control unit is configured to, when a distance to the approaching object is larger by a predetermined value or more than a distance to the screen, restrict or prohibit execution of the driving assistance.

* * * * *